United States Patent
Sakamoto et al.

(10) Patent No.: US 12,512,542 B2
(45) Date of Patent: Dec. 30, 2025

(54) SEALING BODY AND BATTERY

(71) Applicant: Panasonic Intellectual Property Management Co., Ltd., Osaka (JP)

(72) Inventors: Shinichi Sakamoto, Osaka (JP); Shinya Geshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 628 days.

(21) Appl. No.: 17/906,620

(22) PCT Filed: Mar. 26, 2021

(86) PCT No.: PCT/JP2021/013076
§ 371 (c)(1),
(2) Date: Sep. 17, 2022

(87) PCT Pub. No.: WO2021/200737
PCT Pub. Date: Oct. 7, 2021

(65) Prior Publication Data
US 2023/0163387 A1    May 25, 2023

(30) Foreign Application Priority Data
Mar. 31, 2020   (JP) .................... 2020-064950

(51) Int. Cl.
*H01M 50/191* (2021.01)
*H01M 50/107* (2021.01)
(Continued)

(52) U.S. Cl.
CPC ....... *H01M 50/191* (2021.01); *H01M 50/107* (2021.01); *H01M 50/184* (2021.01); *H01M 50/188* (2021.01); *H01M 50/566* (2021.01)

(58) Field of Classification Search
CPC ............ H01M 50/191; H01M 50/107; H01M 50/184; H01M 50/188; H01M 50/566;
(Continued)

(56) References Cited

U.S. PATENT DOCUMENTS

| 2005/0026033 | A1  | 2/2005 | Kawano et al. |
| 2010/0247984 | A1* | 9/2010 | Yamashita ........ H01M 50/1243 429/53 |
| 2020/0006776 | A1  | 1/2020 | Zhou et al. |

FOREIGN PATENT DOCUMENTS

| JP | 2000-090892   | 3/2000 |
| JP | 2005-050609 A | 2/2005 |

(Continued)

OTHER PUBLICATIONS

International Search Report of PCT application No. PCT/JP2021/013076 dated Jun. 1, 2021.
(Continued)

*Primary Examiner* — Ula C Ruddock
*Assistant Examiner* — Sarika Gupta
(74) *Attorney, Agent, or Firm* — Rimon P.C.

(57) ABSTRACT

A battery includes: a case including a cylindrical part, a bottom part that closes one end part of the cylindrical part, and an opening edge part continuous with the other end part of the cylindrical part; an electrode assembly housed in the cylindrical part; and a sealing body fixed to the opening edge so as to seal an opening of the opening edge part, in which the sealing body including a sealing plate made of a first metal and a terminal member made of a second metal different from the first metal and held by the sealing plate is used. The sealing plate includes a fixing part to which the terminal member is fixed, a peripheral edge part in an annular shape located at a peripheral edge, and a thin part formed between the fixing part and the peripheral edge part. The fixing part includes a protrusion part protruding from an
(Continued)

outer surface of the sealing plate, and the protrusion part is bent inward such that a part of the terminal member is sandwiched between the fixing part and the protrusion part.

13 Claims, 2 Drawing Sheets

(51) Int. Cl.
*H01M 50/184* (2021.01)
*H01M 50/188* (2021.01)
*H01M 50/566* (2021.01)

(58) Field of Classification Search
CPC ............. H01M 50/169; H01M 50/171; H01M 50/176; H01M 50/186; H01M 50/193; H01M 50/55; H01M 50/553; H01M 50/562; H01M 50/559; H01M 50/152; H01M 50/159; H01M 50/179; Y02E 60/10
See application file for complete search history.

(56) References Cited

FOREIGN PATENT DOCUMENTS

JP 2010-277785 A 12/2010
KR 10-1808609 B1 12/2017

OTHER PUBLICATIONS

The EPC Office Action dated Jun. 10, 2024 for the related European Patent Application No. 21781070.4.

* cited by examiner

SEALING BODY AND BATTERY

TECHNICAL FIELD

The present disclosure relates to a battery including an electrode assembly and a battery can that houses the electrode assembly.

BACKGROUND ART

A battery usually includes a battery can and an electrode assembly housed in the battery can. The battery can has an opening edge part, and an opening of the opening edge part is sealed by a sealing body.

As a configuration of the sealing body, for example, in PTL 1, a metal dish-shaped lid case, a thin plate-shaped safety valve, and a sealing lid in which a metal lid cap is stacked in order from an inside to an outside of the battery can are provided. The sealing lid is swaged to an open end of the battery can with an insulating gasket interposed therebetween to seal the battery can.

Citation List

Patent Literature

PTL 1: Unexamined Japanese Patent Publication No. 2000-90892

SUMMARY OF THE INVENTION

In PTL 1, since a stacked body in which the lid case, the safety valve, and the lid cap are stacked is crimped in a state of being sandwiched between the open ends of the battery cans with the insulating gasket interposed therebetween, the height of the crimped part in the battery is increased. For this reason, there is a possibility that the energy density of the battery decreases.

One aspect of the present disclosure relates to a sealing body including: a sealing plate made of a first metal; and a terminal member made of a second metal different from the first metal, and held by the sealing plate, in which the sealing plate includes a fixing part to which the terminal member is fixed, an annular peripheral edge part located at a peripheral edge, and a thin part formed between the fixing part and the peripheral edge part, the fixing part includes a protrusion part protruding from an outer surface of the sealing plate, and the protruding part is bent inward, a part of the terminal member being sandwiched between the fixing part and the protruding part.

Another aspect of the present disclosure relates to a battery including: a case including a cylindrical part, a bottom part that closes one end part of the cylindrical part, and an opening edge part continuous to the other end part of the cylindrical part; an electrode assembly housed in the cylindrical part; and the above-described sealing body, in which the sealing body is fixed to the opening edge part to seal an opening of the opening edge part.

According to the present disclosure, it is possible to prevent the peripheral edge part of the sealing body from forming a stacked body. Therefore, even when the terminal member is provided, it is possible to suppress an increase in the height of the crimped part in the battery, and the energy density can be easily increased.

DESCRIPTION OF EMBODIMENT

Figure 1:
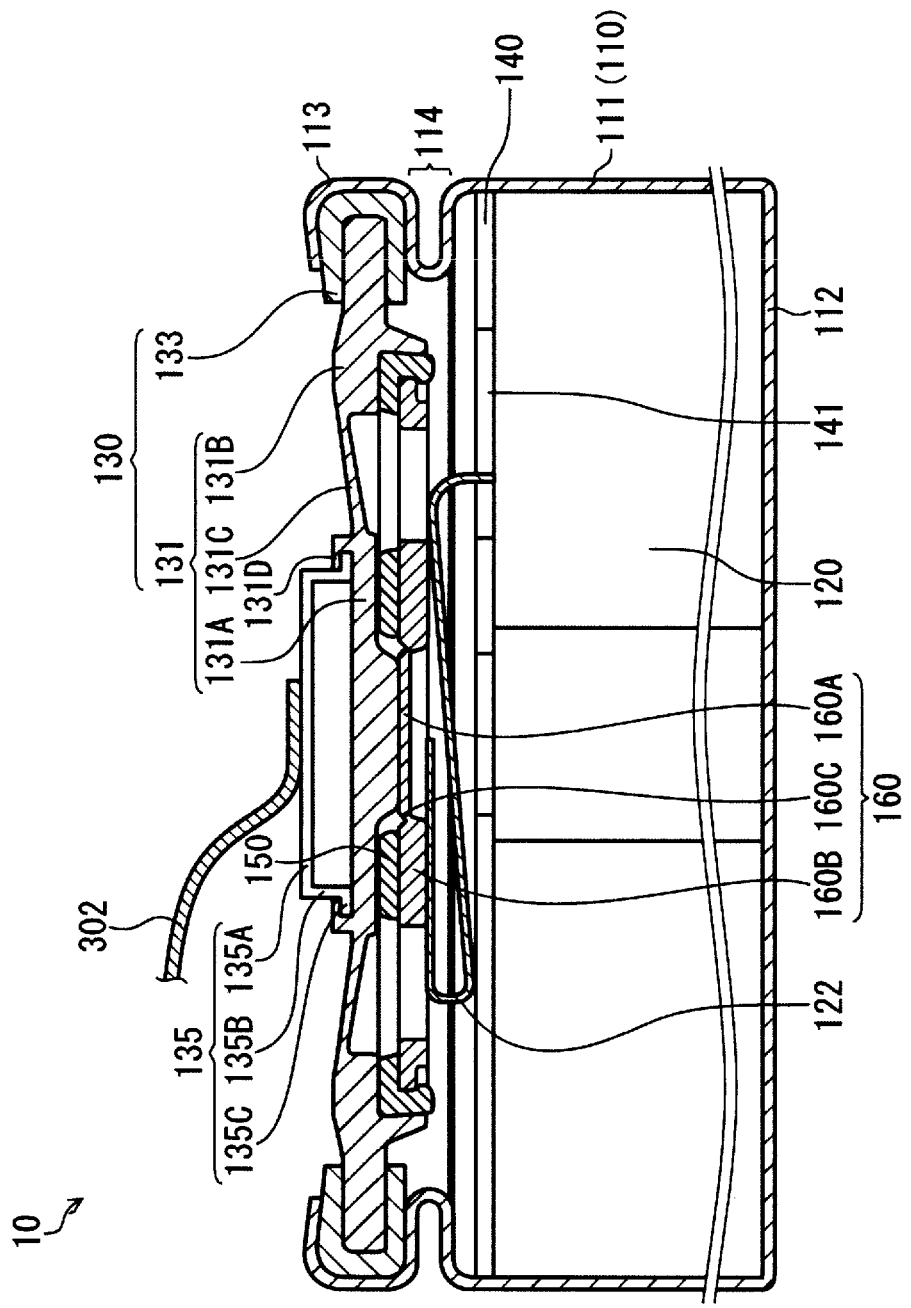
FIG. 1 is a schematic longitudinal cross-sectional view of a main part of a battery according to an exemplary embodiment of the present disclosure.

A sealing body according to the present exemplary embodiment includes a sealing plate including a first metal and a terminal member including a second metal different from the first metal and held by the sealing plate. The sealing plate includes a fixing part to which the terminal member is fixed, an annular peripheral edge part located at a peripheral edge, and a thin part formed between the fixing part and the peripheral edge part. The fixing part includes a protrusion part protruding from an outer surface of the sealing plate. The protrusion part is bent inward such that a part of the terminal member is sandwiched between the fixing part and the protrusion part.

The sealing body is used for sealing an opening of a case for housing an electrode assembly in a battery. In the sealing body, the sealing plate is electrically connected to one electrode (for example, a positive electrode) of the electrode assembly. In attachment of the battery, the sealing plate is also electrically connected to a current collecting member such as an external lead wire, and one electrode of the electrode assembly and the external lead wire are electrically connected via the sealing plate. The sealing plate and the external lead wire are joined by welding, for example.

As the first metal constituting the sealing plate, for example, aluminum or an aluminum alloy can be preferably used because it is lightweight and excellent in corrosion resistance. However, the sealing plate containing aluminum is not easily welded to the current collecting member made of a metal other than aluminum, and it is difficult to form good joining by welding. For this reason, there is a demand for connecting the current collecting member and the sealing body with a metal material (for example, a material containing iron) which is easily welded.

For this purpose, it is also possible to adopt the configuration of PTL 1 and seal the lid case, the safety valve, and the lid cap by overlapping and caulking using an iron lid cap. However, in this case, since the opening edge part is caulked and sealed in the stacked member, a height (thickness) of the caulked part is required, and when the battery is maintained at a constant height, a height of the electrode assembly is limited by the height of the caulked part. On the other hand, in order to maintain the height of the electrode assembly, a height of the battery increases. Therefore, it is difficult to realize a battery having a high energy density.

In addition, in the configuration described in PTL 1, since three types of members including the lid case, the safety valve, and the lid cap are overlapped and sealed with a gasket, the number of interfaces between the members is large, and the airtightness is easily reduced.

On the other hand, according to the present exemplary embodiment, even when the sealing plate and the terminal member are made of different materials, good electrical connection can be maintained between the sealing plate and the terminal member. On the other hand, electrical connection with the current collecting member can be performed via a terminal member fixed to the sealing plate. As the material of the terminal member, any material that is easily connected to the current collecting member may be used, and a material containing iron may be used. This makes it possible to achieve good electrical connection between the sealing body and the external lead wire regardless of the metal material constituting the sealing plate. Note that the current collecting member has a function of electrically connecting a plurality of batteries to each other or a function of connecting a battery to an external electronic device or electronic circuit. The current collecting member may be a lead wire or a metal sheet having welded parts at both ends.

Further, the opening of the case can be sealed by, for example, caulking the opening edge part to the sealing plate via the gasket, so that the height of the caulked part is not increased by the terminal member. Therefore, a battery having a high energy density can be easily realized.

Furthermore, since it is possible to avoid that the peripheral edge part of the sealing body is a stacked body of members, the number of interfaces between the members of the caulked part, which can serve as passages for gas and moisture, is reduced as compared with a configuration in which the peripheral edge part is a stacked body of members. Therefore, the reliability of sealing as a battery is enhanced.

The sealing plate has a fixing part, and the fixing part is provided with a protrusion part protruding from an outer surface of the sealing plate. After being planted from the outer surface of the sealing plate, the protrusion part extends while being bent inward (that is, in an inner circumferential direction of a cylindrical part of the battery after sealing), and a part of the end part of the terminal member is sandwiched between the fixing part and the protrusion part. As a result, the terminal member and the sealing plate are engaged and electrically connected, and the terminal member is fixed to the sealing plate. Further, the protrusion part is bent away from the thin part of the sealing plate to engage with the terminal member. Therefore, when the protrusion part is bent, it is possible to prevent a part of the fixing part from escaping toward the thin part and the thickness of the thin part from varying.

The protrusion part is bent, for example, by applying a force to the protrusion part using a mold or the like. At this time, a force in a bending direction is also applied to a part of the protrusion part located near a base from the bending position. Accordingly, the base part may be deformed, and the thickness of the sealing plate on a side of the bending direction may fluctuate. Therefore, if there is a thin part on the side of the bending direction from a planting position of the protrusion part, the thickness of the thin part may fluctuate. On the other hand, since the protrusion part is bent in a direction away from the thin part, it is possible to suppress the thickness of the thin part from being biased.

Specifically, the fixing part is a part assumed to come into contact with the terminal member in the sealing plate and a region in the vicinity thereof. Further, it is also a region that is thicker than the thin part and has a thin part formed around the thin part. Note that the protrusion part may be annularly (or cylindrically) formed in the fixing part, or may be intermittently provided in the circumferential direction. Since the terminal member is connected by the fixing part, displacement of the thin part is hardly inhibited as compared with a configuration in which the terminal member is disposed so as to cover the thin part. In other words, it is not necessary to design the terminal member (in particular, the top plate part) to be separated from the thin part by a certain distance or more in the height in consideration of the region where the thin part is displaced when a pressure in the case increases, and it is possible to suppress an increase in size of the terminal member.

The terminal member includes, for example, a top plate part, a side wall part bent and extending from a peripheral edge of the top plate part toward the sealing plate, and a flange part. The flange part is connected to the side wall part and extends outward, for example, in a plane direction parallel to the top plate part. Since the terminal member has the side wall part and the flange part, a heat energy generated when the terminal member is joined to the current collecting member by welding in the top plate part can be suppressed from being transmitted to the inside of the battery. The side wall part may be bent and extend over the entire circumference of the top plate part. In this case, the terminal member may have a cap shape. The top plate part corresponds to a lid part of the cap, and the side wall part corresponds to a side wall part of the cap. The side wall part may be disposed intermittently in the circumferential direction from the top plate part. Note that the terminal member may be a disk without a side wall part or a flange part. In this case, the protrusion part is bent toward the peripheral edge of the terminal member that is a disk.

The flange part extends from an end part of the side wall part near the sealing plate in a direction away from the top plate part (that is, an outer circumferential direction of the cylindrical part in the battery after sealing). The flange part may protrude in a direction away from the top plate part over the entire circumference of the end part of the side wall part, or may protrude in a direction away from the top plate part in a part of the entire circumference of the end part of the side wall part. The flange part may be bent from an end part of the side wall part and extend from the top plate part, or may be erected on an outer peripheral surface of the side wall part. Further, the flange part may have a plate shape, and in particular, in a case where the flange part is partially provided instead of the entire circumference of the side wall part, the flange part may be a columnar or conical protrusion. Furthermore, when the flange part has a plate shape, a stepped or inclined recess may be formed on the outer peripheral edge of the flange part, and a part of the protrusion part bent toward the terminal member may be accommodated in the recess. With this configuration, a connection space between the terminal member and the protrusion part can be reduced. Further, when the flange part has a plate shape, the end surface of the flange part connected to the main surface located at both ends in the thickness may be inclined, and the protrusion part may be bent so as to be inclined along the inclination of the end surface. With this configuration, the end surface of the flange part and the protrusion part can be electrically connected.

The flange part is sandwiched between the protrusion part of the sealing plate and the outer surface of the sealing plate facing the protrusion part, and is fixed in close contact with the sealing plate by pressing. Further, a joint by welding may be formed between the protrusion part and the flange part so that the close contact is strengthened. The joining by welding may be joining by laser welding. The laser welding may be performed by laser irradiation from the outer surface of the protrusion part and through welding. In this case, when the thickness of the flange part is smaller than the thickness of the side wall part, penetration welding is easily performed. Note that it is not always necessary to perform through welding, and when the protrusion part covers an upper surface of the flange part (a back surface of the surface facing the fixing part in the flange part), the protrusion part and the flange part may be joined only by welding.

A battery having a high energy density can be realized using the sealing body. A battery according to the present exemplary embodiment includes a case including a cylindrical part, a bottom part that closes one end part of the cylindrical part, and an opening edge part continuous to the other end part of the cylindrical part, an electrode assembly housed in the cylindrical part, and the above-described sealing body. The sealing body is fixed to the opening edge part so as to seal an opening of the opening edge part.

Hereinafter, a direction from the sealing body toward the electrode assembly is referred to as a downward direction, and a direction from the electrode assembly toward the sealing body is referred to as an upward direction. Generally, when the case is erected with the bottom part down, a direction parallel to an axis of the cylindrical part towards the opening edge part is the upward direction. Hereinafter, a length in the up-down direction may be referred to as height.

Sealing of the opening of the case can be performed, for example, by disposing a gasket on the peripheral edge part of the sealing plate and caulking the opening edge part to the peripheral edge part of the sealing plate via the gasket. For example, an annular groove part is formed on an outer peripheral surface of the cylindrical part so that an inner peripheral surface of the cylindrical part protrudes inward of the cylindrical part, and the opening edge part is bent on the opening side of the groove part. The opening edge part can be bent such that the gasket and the sealing plate are sandwiched between the opening edge part and the groove part to seal between the sealing body and the opening edge part. In other words, it is possible to seal between the sealing body and the opening edge part by sandwiching the sealing body including the gasket between the groove part and the opening edge part. In this case, since the terminal member is not used for sealing, the height of the electrode assembly is not limited by the terminal member, and there is no hindrance in realizing a battery having a high energy density.

Hereinafter, a sealing body and a battery according to an exemplary embodiment of the present disclosure will be specifically described with reference to the drawings. However, the present invention is not limited thereto.

FIG. 1 is a schematic longitudinal cross-sectional view of a main part of battery 10 including sealing body 130 according to the present exemplary embodiment. Battery 10 includes cylindrical bottomed case 110, cylindrical electrode assembly 120 housed in a can, and sealing body 130 that seals an opening of case 110.

Case 110 includes cylindrical part 111 that houses electrode assembly 120, bottom part 112 which closes one end part of cylindrical part 111, and opening edge part 113 that is continuous to the other end part of cylindrical part 111. An opening of opening edge part 113 is closed by sealing body 130.

Sealing body 130 includes sealing plate 131 and gasket 133 disposed on peripheral edge part 131B of sealing plate 131. Sealing plate 131 may have a disk shape and has an explosion-proof function. Specifically, sealing plate 131 is provided in a central region, and includes thick fixing part 131A and peripheral edge part 131B in order to secure structural strength, and thin part 131C exhibiting an explosion-proof function. Thin part 131C is provided in a region between peripheral edge part 131B and fixing part 131A. Peripheral edge part 131B and thin part 131C are formed in an annular shape so as to surround fixing part 131A, for example.

Sealing body 130 further includes terminal member 135. Terminal member 135 is engaged with sealing plate 131 at fixing part 131A, and is held by sealing plate 131.

Terminal member 135 has, for example, a cap shape including top plate part 135A and side wall part 135B bent and extending from a peripheral edge of top plate part 135A toward sealing plate 131. In terminal member 135, flange part 135C is bent in an outer peripheral direction of cylindrical part 111 from an end part of side wall part 135B on a side of sealing plate 131, and extends away from top plate part 135A.

Fixing part 131A is provided with protrusion part 131D protruding from an outer surface of sealing plate 131. Protrusion part 131D is bent in an inner circumferential direction of cylindrical part 111 and is engaged with flange part 135C of terminal member 135. Accordingly, terminal member 135 is fixed to and electrically connected to sealing plate 131. Protrusion part 131D and flange part 135C may be formed over the entire circumference of side wall part 135B or may be intermittently formed on a part of the circumference of side wall part 135B.

Sealing plate 131 is made of a first metal. The first metal may be, for example, a metal containing aluminum. The metal containing aluminum may be, for example, metal aluminum or an aluminum alloy. On the other hand, terminal member 135 is made of a second metal different from the first metal constituting sealing plate 131. The second metal may be, for example, a metal containing at least one of iron and nickel. The metal containing iron may be, for example, iron or an iron alloy. As the iron alloy, stainless steel may be used. As the second metal, one obtained by plating iron or an iron alloy with nickel or the like may be used.

In order to strengthen the fixing and the electrical connection, the engagement part between protrusion part 131D and flange part 135C may be joined by welding. The welding may be performed by, for example, irradiating an outer surface of the protrusion part 131D covering flange part 135C with laser light from a side of top plate part 135A to perform penetration welding. The welding may be performed at one place or a plurality of places on the periphery of side wall part 135B.

Figure 2:
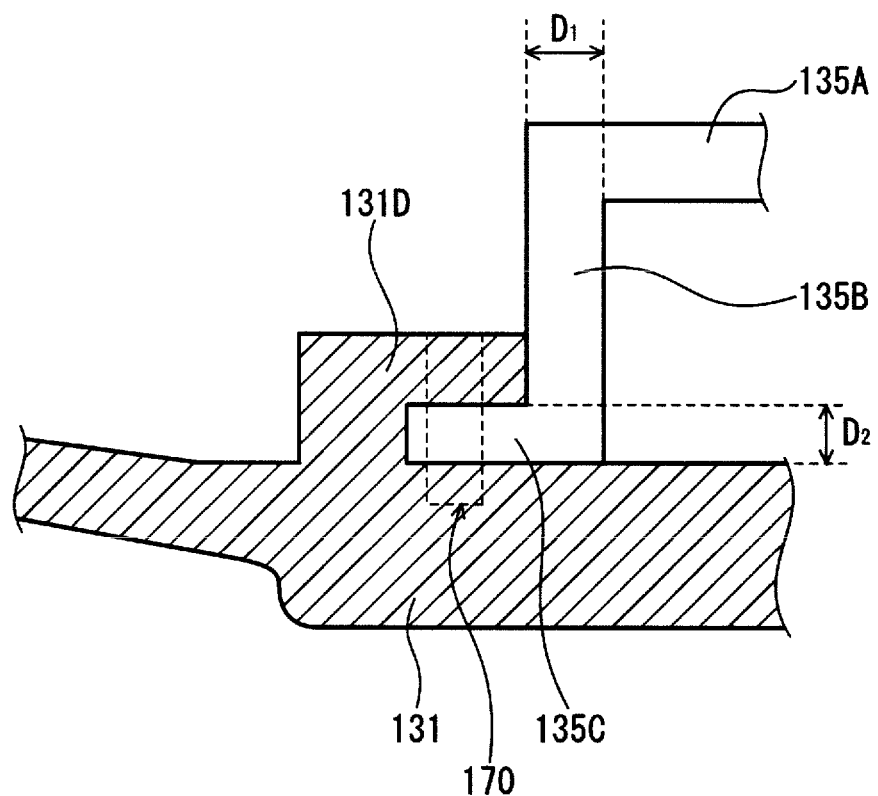
FIG. 2 is an enlarged cross-sectional view of a main part illustrating an engagement part between a protrusion part of a sealing plate and a flange part of a terminal member in FIG. 1.

FIG. 2 is an enlarged cross-sectional view illustrating an engagement part between sealing plate 131 and terminal member 135 in FIG. 1. Welding mark 170 due to penetration welding is formed between protrusion part 131D and flange part 135C. Welding mark 170 penetrates flange part 135C and can be formed to a depth exceeding the outer surface of sealing plate 131 (fixing part 131A) facing protrusion part 131D with flange part 135C interposed therebetween. In terminal member 135, thickness $D_2$ of flange part 135C may be made smaller than thickness $D_1$ of side wall part 135B in order to facilitate the formation of joining by welding up to the depth penetrating flange part 135C.

Sealing plate 131 is also in contact with terminal plate 160 on an inner surface (a surface facing electrode assembly 120) of fixing part 131A. Terminal plate 160 includes central region 160A, peripheral edge part 160B, and thin part 160C provided between central region 160A and peripheral edge part 160B. Central region 160A of terminal plate 160 is in contact with fixing part 131A of sealing plate 131. Central region 160A of terminal plate 160 and fixing part 131A of sealing plate 131 may be welded to each other.

On the other hand, peripheral edge part 160B of terminal plate 160 is connected to an end part of internal lead 122 led out from the positive electrode or the negative electrode constituting electrode assembly 120. Accordingly, sealing plate 131 (and terminal member 135) has one terminal function. By connecting current collecting member 302 to terminal member 135, electrical connection with one electrode (first electrode) of electrode assembly 120 can be performed.

Note that insulating member 150 is interposed between peripheral edge part 160B of terminal plate 160 and fixing part 131A of sealing plate 131. Insulating member 150 may be formed integrally with gasket 133. Note that in the battery of the present disclosure, terminal plate 160 and insulating member 150 are not essential. Internal lead 122 may be directly connected to fixing part 131A.

Between cylindrical part 111 and opening edge part 113 of case 110, groove part 114 having an inner diameter smaller than an inner diameter of a cylindrical part of opening edge part 113 and an inner diameter of cylindrical part 111 is provided. That is, opening edge part 113 is continuous with cylindrical part 111 via groove part 114.

Sealing body 130 is disposed above groove part 114 (on the side away from electrode assembly 120), and opening edge part 113 is bent so as to sandwich sealing body 130 (sealing plate 131 and gasket 133) disposed on groove part 114. As a result, gasket 133 is pressed in the up-down direction, and battery 10 is sealed. A repulsive force of the gasket due to the pressing secures airtightness of battery 10.

Internal insulating plate 140 may be disposed below groove part 114 (on a side of electrode assembly 120) to prevent electrode assembly 120 from coming into contact with sealing body 130 and terminal plate 160. Internal insulating plate 140 is provided with predetermined lead hole 141. Internal lead 122 led out from one electrode constituting electrode assembly 120 is connected to terminal plate 160 through lead hole 141 and is electrically connected to sealing body 130. On the other hand, the other electrode (second electrode) constituting electrode assembly 120 is electrically connected to case 110.

In sealing body 130, sealing plate 131 and gasket 133 may be integrally molded by, for example, insert molding.

A material of gasket 133 is not limited. For example, polypropylene (PP), polyphenylene sulfide (PPS), polyethylene (PE), polybutylene terephthalate (PBT), perfluoroalkoxyalkane (PFA), polytetrafluoroethylene (PTFE), polyamide (PA), or the like can be used as a material that can be easily integrally molded.

In battery 10 of the present exemplary embodiment, when the internal pressure increases, a pressure directed outward is applied to sealing body 130 and terminal plate 160. Accordingly, sealing plate 131 and terminal plate 160 are pushed up outward. When the internal pressure exceeds a predetermined value, first, thin part 160C of terminal plate 160 breaks, and central region 160A and peripheral edge part 160B are electrically separated. As a result, the electrical connection between sealing plate 131 and internal lead 122 is cut off, and the current flowing in battery 10 is cut off.

When the internal pressure of battery 10 does not decrease even in a state where the current is cut off, for example, stress due to tension concentrates on a boundary part between peripheral edge part 131B and thin part 131C of sealing plate 131, and breakage occurs from the boundary part. As a result, the internal pressure of battery 10 is released, and the safety of battery 10 is secured. Note that the current interrupting mechanism described above does not limit the present invention. The present invention can be applied to either a battery including the current interrupting mechanism or a battery not including the current interrupting mechanism. The configuration of the current interrupting mechanism is not limited to the above specific example, and any configuration may be adopted.

In the above exemplary embodiment, terminal member 135 has a cap shape, but it is not necessarily a cap shape. In terminal member 135, side wall part 135B may be bent and extended in the entire circumference of top plate part 135A, or the side wall part may not be provided in a part of the circumference of top plate part 135A. Since terminal member 135 is not used for sealing, even if there is a region where the side wall part 135B (and flange part 135C) is not provided in a part of the circumference of top plate part 135A, airtightness is not affected.

Further, in the above exemplary embodiment, groove part 114 is provided in cylindrical part 111 of case 110 to perform sealing, but the present invention is not limited to the groove part. The terminal member of the present disclosure is not limited to the battery produced by the sealing method described above, and can also be preferably used in a case of adopting a conventional sealing method in which a groove part is not provided.

Examples of the sealing method without the groove part include a method of sealing by welding, and a method of pressing the side wall part of the gasket in a radial direction of the opening (direction toward the axis of the cylindrical part) via the opening edge part of the case. In these cases, since the height of the electrode assembly can be increased by the width (height) of the groove part by not providing the groove part, it is possible to further increase the capacity.

Next, a configuration of electrode assembly 120 will be exemplified using a lithium ion secondary battery as an example.

Cylindrical electrode assembly 120 is a winding type. Cylindrical electrode assembly 120 is formed by spirally winding a positive electrode and a negative electrode with a separator interposed therebetween. Internal lead 122 is connected to one of the positive electrode and the negative electrode. Internal lead 122 is electrically connected to fixing part 131A of sealing plate 131. Another lead wire is connected to the other of the positive electrode and the negative electrode, and another lead wire is connected to an inner surface of case 110 by welding or the like.

(Negative electrode)

The negative electrode includes a strip-shaped negative electrode current collector, and negative electrode active material layers formed on both surfaces of the negative electrode current collector. As the negative electrode current collector, a metal film, a metal foil, or the like is used. A material of the negative electrode current collector is preferably at least one selected from a group consisting of copper, nickel, titanium, alloys of these metals, and stainless steel. A thickness of the negative electrode current collector is preferably, for example, 5 μm to 30 μm.

The negative electrode active material layer contains a negative electrode active material, and further contains a binder and an electrically conductive agent when necessary. The negative electrode active material layer may be a deposited film formed by a gas phase method (for example, vapor deposition). As the negative electrode active material, Li metal, metal or an alloy which electrochemically reacts with Li, a carbon material (for example, graphite), a silicon alloy, a silicon oxide, and a metal oxide (for example, lithium titanate) are named. A thickness of the negative electrode active material layer is preferably, for example, 1 μm to 300 μm.

(Positive electrode)

The positive electrode includes a strip-shaped positive electrode current collector, and positive electrode active material layers formed on both surfaces of the positive electrode current collector. As the positive electrode current collector, a metal film, a metal foil (a stainless steel foil, an aluminum foil or an aluminum alloy foil) or the like is used.

The positive electrode active material layer contains a positive electrode active material and a binder, and further contains an electrically conductive agent when necessary. The positive electrode active material is not particularly limited, but a lithium-containing composite oxide such as LiCoO$_2$ or LiNiO$_2$ can be used. A thickness of the positive electrode active material layer is preferably, for example, 1 μm to 300 μm.

As the electrically conductive agent to be contained in each active material layer, graphite, carbon black, or the like is used. An amount of the electrically conductive agent is, for example, 0 parts by mass to 20 parts by mass per 100 parts by mass of the active material. As a binder to be contained in the active material layer, a fluororesin, an acrylic resin, rubber particles, or the like is used. An amount of the binder is, for example, 0.5 parts by mass to 15 parts by mass per 100 parts by mass of the active material.

(Separator)

As a separator, a microporous film or nonwoven fabric made of resin is preferably used. A material (resin) of the separator is preferably polyolefin, polyamide, polyamideimide, or the like. A thickness of the separator is, for example, 8 μm to 30 μm.

(Electrolyte)

As the electrolyte, a nonaqueous solvent in which a lithium salt is dissolved can be used. As the lithium salt, LiClO$_4$, LiBF$_4$, LiPF$_6$, LiCF$_3$SO$_3$, LiCF$_3$CO$_2$, and imide salts are named. As the nonaqueous solvent include cyclic carbonate esters such as propylene carbonate, ethylene carbonate, and butylene carbonate; chain carbonate esters such as diethyl carbonate, ethyl methyl carbonate, and dimethyl carbonate; and cyclic carboxylate esters such as γ-butyrolactone and γ-valerolactone are named.

Although the lithium ion secondary battery has been described above as an example, the present disclosure can be used in a battery in which a battery can is sealed using a sealing body regardless of whether the battery is a primary battery or a secondary battery.

INDUSTRIAL APPLICABILITY

The battery according to the present disclosure can be used for various can type batteries, and is suitable for use as a power source for, for example, mobile devices, hybrid automobiles, electric automobiles, power-assisted bicycles, electric motorcycles, and the like.

REFERENCE MARKS IN THE DRAWINGS

10: battery
110: case
111: cylindrical part
112: bottom part
113: opening edge part
114: groove part
120: electrode assembly
122: internal lead
130: sealing body
131: sealing plate
131A: fixing part
131B: peripheral edge part
131C: thin part
131D: protrusion part
133: gasket
135: terminal member
135A: top plate part
135B: side wall part
135C: flange part
140: internal insulating plate
141: lead hole
150: insulating member
160: terminal plate
160A: central region
160B: peripheral edge part
160C: thin part
170: welding mark
302: current collecting member

The invention claimed is:

1. A sealing body of a battery comprising:
a sealing plate including a first metal; and
a terminal member including a second metal different from the first metal, and held by the sealing plate, wherein:
the sealing plate includes a fixing part fixing the terminal member, a peripheral edge part in an annular shape located at a peripheral edge of the sealing plate, and a thin part located between the fixing part and the peripheral edge part,
the fixing part includes a protrusion part protruding from an outer surface of a part of the sealing plate other than the thin part,
the protrusion part is bent inward, and a part of the terminal member is sandwiched between the fixing part and the protrusion part, and
the thin part is inclined, inward within the sealing body, from the peripheral edge to a rising portion of the protrusion part.

2. The sealing body according to claim 1, wherein
the terminal member includes a top plate part, a side wall part bent and extending from a peripheral edge of the top plate part toward the sealing plate, and a flange part extending in a direction away from the top plate part from an end part of the side wall part near the sealing plate,
the side wall part forms a cylindrical shape, and
the flange part has an annular shape and is engaged with the protrusion part.

3. The sealing body according to claim 2, wherein the sealing body includes joint by welding between the protrusion part and the flange part.

4. The sealing body according to claim 3, wherein the flange part includes a thickness thinner than a thickness of the side wall part.

5. The sealing body according to claim 1, wherein
the first metal contains aluminum, and
the second metal contains at least one of iron and nickel.

6. A battery comprising:
a case including a cylindrical part, a bottom part that closes one end part of the cylindrical part, and an opening edge part continuous to another end part of the cylindrical part;
an electrode assembly housed in the cylindrical part; and
the sealing body according to claim 1, wherein the sealing body is fixed to the opening edge part to seal an opening of the opening edge part.

7. The battery according to claim 6, wherein
a groove part in an annular shape is disposed on an outer peripheral surface of the cylindrical part, an inner peripheral surface of the cylindrical part protruding inward of the cylindrical part,
the sealing body further includes a gasket covering the peripheral edge part, and
the opening edge part is bent to sandwich the gasket and the sealing plate between the opening edge part and the groove part, and a space between the sealing body and the opening edge part is sealed.

8. The sealing body according to claim 1, wherein
the thin part has an annular shape surrounding the fixing part.

9. The sealing body according to claim 1, wherein a lower surface of the terminal member is fixed to an upper surface of the fixing part.

10. The sealing body according to claim 1, wherein the thin part is not covered by the terminal member.

11. The sealing body according to claim 1, wherein the protrusion part is bent only inward to cover the part of the terminal member being sandwiched between the fixing part and the protrusion part.

12. The sealing body according to claim 2, wherein the protrusion part is bent only inward to cover the flange part being sandwiched between the fixing part and the protrusion part.

13. The sealing body according to claim 1, wherein an outermost peripheral edge of the terminal member is sandwiched between the fixing part and the protrusion part.

* * * * *